(12) United States Patent
Chen

(10) Patent No.: US 11,803,941 B2
(45) Date of Patent: Oct. 31, 2023

(54) METHOD FOR REMOVING FRINGE NOISE IN IMAGE

(71) Applicant: BOE TECHNOLOGY GROUP CO., LTD., Beijing (CN)

(72) Inventor: Guannan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 287 days.

(21) Appl. No.: 17/030,304

(22) Filed: Sep. 23, 2020

(65) Prior Publication Data

US 2021/0224955 A1 Jul. 22, 2021

(30) Foreign Application Priority Data

Jan. 22, 2020 (CN) .......................... 202010073136.0

(51) Int. Cl.
*G06T 5/10* (2006.01)
*G06T 5/00* (2006.01)

(52) U.S. Cl.
CPC ............... *G06T 5/002* (2013.01); *G06T 5/10* (2013.01); *G06T 2207/20056* (2013.01); *G06T 2207/20182* (2013.01)

(58) Field of Classification Search
CPC . G06T 5/002; G06T 5/10; G06T 2207/20182; G06T 5/00; G06T 2207/20024; G06T 2207/20056; G06T 2207/20048; G06V 10/30; G06V 30/164; G06V 10/89; G06K 9/00
See application file for complete search history.

(56) References Cited

U.S. PATENT DOCUMENTS

| 11,096,553 B2 * | 8/2021 | Sonnenborg ............... G06T 5/20 |
| 2004/0071363 A1 * | 4/2004 | Kouri .................. G06K 9/00516 382/128 |
| 2014/0023258 A1 | 1/2014 | Imai |
| 2018/0174274 A1 | 6/2018 | Pei et al. |

FOREIGN PATENT DOCUMENTS

| CN | 103442641 A |   | 12/2013 |   |
| CN | 104580937 A | * | 4/2015 |   |
| CN | 104580937 A |   | 4/2015 |   |
| CN | 106462957 A |   | 2/2017 |   |
| CN | 109146812 A | * | 1/2019 | ............. G06T 5/002 |

OTHER PUBLICATIONS

First Office Action dated Feb. 11, 2023, for Chinese Patent Application No. 202010073136.0.

* cited by examiner

*Primary Examiner* — Sumati Lefkowitz
*Assistant Examiner* — Michael Adam Shariff
(74) *Attorney, Agent, or Firm* — Kinney & Lange, P.A.

(57) ABSTRACT

A method for removing fringe noise in an image includes: acquiring an original image; acquiring an original frequency spectrum of one-dimensional signal of the original image; determining a noise frequency band in the original frequency spectrum, and the noise frequency band is a frequency band including a central frequency of the fringe noise; denoising the noise frequency band to obtain a denoised frequency spectrum, wherein a denoising intensity used in the denoising is gradually increased from a start frequency position of the noise frequency band, and the denoising intensity is gradually reduced from the central frequency until a stop frequency position of the noise frequency band; and generating a denoised image according to the denoised frequency spectrum.

16 Claims, 6 Drawing Sheets

METHOD FOR REMOVING FRINGE NOISE IN IMAGE

CROSS-REFERENCE TO RELATED APPLICATION

This application claims the benefit of Chinese Patent Application No. 202010073136.0 filed on Jan. 22, 2020 in the National Intellectual Property Administration of China, the whole disclosure of which is incorporated herein by reference.

TECHNICAL FIELD

The present disclosure relates to a technical field of digital image processing, in particular to a method for removing fringe noise in an image.

BACKGROUND

A fringe noise in an image is one of the factors that affect the image quality in electronic equipment. A characteristic of the fringe noise is that the amplitude and phase of the noise in the same row (column) in the image are the same, and the amplitude and phase of the noise in different rows (columns) are different.

A method of removing fringe noise in the image may cause ringing at the edges of the image, thereby reducing image quality.

SUMMARY

According to an aspect of the present disclosure, there is provided a method for removing fringe noise in an image, comprising: acquiring an original image; acquiring an original frequency spectrum of one-dimensional signal of the original image; determining a noise frequency band in the original frequency spectrum, and the noise frequency band is a frequency band comprising a central frequency of the fringe noise; denoising the noise frequency band to obtain a denoised frequency spectrum, wherein a denoising intensity used in the denoising is gradually increased from a start frequency position of the noise frequency band, and the denoising intensity is gradually reduced from the central frequency until a stop frequency position of the noise frequency band; and generating a denoised image according to the denoised frequency spectrum.

For example, the central frequency of the fringe noise is in a middle of the noise frequency band.

For example, the denoising the noise frequency band comprises: denoising the noise frequency band according to a sigmoid function $$H(x) = 1 - \frac{1}{1+e^{\left(\frac{-(x-x_{bs})}{\theta}\right)}} + \frac{1}{1+e^{\left(\frac{-(x-x_{be})}{\theta}\right)}},$$

wherein $x_{bs}$ is a start frequency of the noise frequency band, $X_{be}$ is a stop frequency of the noise frequency band, and $\theta$ is a steep coefficient of a transition band of a band-stop filter.

For example, the acquiring an original frequency spectrum of one-dimensional signal of the original image comprises: sampling the original image row by row or column by column to obtain the one-dimensional signal; and performing Fast Fourier Transform FFT on the one-dimensional signal to obtain the original frequency spectrum of the one-dimensional signal.

For example, the sampling the original image row by row or column by column comprises: performing RGB channels separation processing on the original image; and sampling the original image row by row or column by column respectively.

For example, the method further comprises performing RGB channels combination on the denoised image.

For example, the sampling the original image row by row or column by column comprises: in response to the fringe noise contained in the original image being a horizontal fringe noise, sampling the original image column by column.

For example, the sampling the original image row by row or column by column comprises: in response to the fringe noise contained in the original image being a vertical fringe noise, sampling the original image row by row.

For example, the sampling the original image column by column comprises: sampling any row of the original image to obtain a one-dimensional row signal, and sampling any column of the original image to obtain a one-dimensional column signal; performing FFT on the one-dimensional row signal and the one-dimensional column signal respectively to obtain a frequency spectrum of the one-dimensional row signal and a frequency spectrum of the one-dimensional column signal; determining a first peak of a predetermined frequency band of the frequency spectrum of the one-dimensional row signal, and determining a second peak of a predetermined frequency band of the frequency spectrum of the one-dimensional column signal; comparing the first peak with the second peak; in response to the first peak being less than or equal to the second peak, determining that the fringe noise in the original image is the horizontal fringe noise; and in response to the first peak being greater than the second peak value, determining that the fringe noise in the original image is the vertical fringe noise.

For example, sampling the original image row by row comprises: sampling any row of the original image to obtain a one-dimensional row signal, and sampling any column of the original image to obtain a one-dimensional column signal; performing FFT on the one-dimensional row signal and the one-dimensional column signal respectively to obtain a frequency spectrum of the one-dimensional row signal and a frequency spectrum of the one-dimensional column signal; determining a first peak of a predetermined frequency band of the frequency spectrum of the one-dimensional row signal, and determining a second peak of a predetermined frequency band of the frequency spectrum of the one-dimensional column signal; comparing the first peak with the second peak; in response to the first peak being less than or equal to the second peak, determining that the fringe noise in the original image is a horizontal fringe noise; and in response to the first peak being greater than the second peak, determining that the fringe noise in the original image is a vertical fringe noise.

According to an aspect of the present disclosure, there is provided a device for removing a fringe noise in an image, comprising: an acquisition module configured to acquire an original image and acquire an original frequency spectrum of one-dimensional signal of the original image; a determination module configured to determine a noise frequency band in the original frequency spectrum, and the noise frequency band is a frequency band comprising a central frequency of the fringe noise; a denoising module configured to denoise the noise frequency band to obtain a denoised frequency spectrum, and a generation module configured to generate a denoised image according to the denoised frequency spectrum; wherein a denoising intensity used in the denoising is gradually increased from a start frequency position of the noise frequency band, and the denoising intensity is gradually reduced from the central frequency until a stop frequency position of the noise frequency band.

According to an aspect of the present disclosure, there is provided an electronic device, comprising: at least one processor; and at least one memory connected to the processor, on which computer-readable instructions are stored; wherein the processor is configured to execute the computer-readable instructions to implement the method as mentioned above.

According to an aspect of the present disclosure, there is provided a non-transitory computer-readable storage medium comprising computer-readable instructions stored thereon, wherein when the computer-readable instructions are executed, the method as mentioned above is executed.

BRIEF DESCRIPTION OF THE DRAWINGS

By reading the detailed description of the preferred embodiments hereafter, various other advantages and benefits will become clear to those of ordinary skill in the art. The drawings are only used for the purpose of illustrating the preferred embodiments, and are not considered as a limitation to the present disclosure. Also, throughout the drawings, the same reference numbers are used to denote the same components, in which.

DETAILED DESCRIPTION OF EMBODIMENTS

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

When electronic equipment digitizes an image, image fringes are introduced due to the physical sampling method. For example, the interlaced scanning method of video, the grid projection of anti-scatter grid of light sensor, etc., may introduce fringe noise into the image. Therefore, removing the fringe noise in the image is very important to improve the image quality.

The method for removing a fringe noise in an image may include: transforming the image into a frequency domain by using Fast Fourier Transform (FFT) to obtain a frequency spectrum corresponding to the image, determining a frequency point corresponding to the fringe noise in the frequency spectrum and suppressing the fringe noise, and obtaining the suppressed image using the Inverse Fast Fourier transform (IFFT). This method may remove the fringe noise in the image.

However, in the above method of removing fringe noise, as the stepped band-stop filter is used in the frequency domain to process the frequency domain components of the fringe noise, it may cause ringing at the edges of the image, resulting in the loss of useful information in the image inverse transformation process, thereby reducing the image quality. The embodiments of the present disclosure provide a method and a device for removing a fringe noise in an image, and the method and device are applied to an image displayed by an electronic device, for example, video screens on TV, photos displayed on mobile phones, etc. According to the method and the device for removing the fringe noise in an image provided by the embodiments of the present disclosure, while removing the fringe noise in the image, it may retain the useful information near the noise frequency point, thereby making the transition of the image edge more natural, avoiding ringing effects, and improving image quality.

Figure 1:
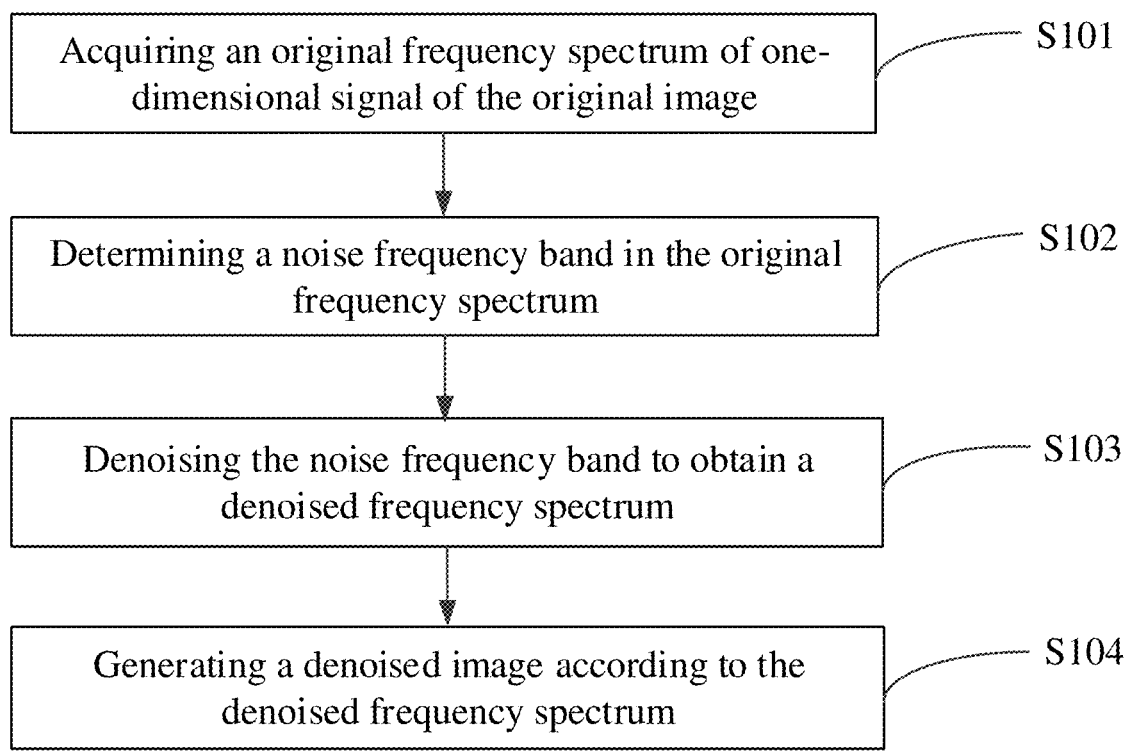
FIG. 1 is a flowchart of a method for removing fringe noise in an image according to an embodiment of the present disclosure.

FIG. 1 is a flowchart of a method for removing a fringe noise in an image in an embodiment of the disclosure. As shown in FIG. 1, the method may include the following steps.

In step S101, an original image is acquired and an original frequency spectrum of one-dimensional signal of the original image is acquired.

The original image is an image containing fringe noise. It may be the original image containing a horizontal fringe noise, or it may be the original image containing a vertical fringe noise, which is not limited here.

Subsequent to acquire the original image, since the original image belongs to a two-dimensional signal in the spatial domain, in order to facilitate the conversion of the original image to the frequency domain, it is necessary to convert the two-dimensional original image into a one-dimensional signal. For example, the following methods may be adopted but not limited to: sampling the original image row by row or column by column, taking the signal of each row or each column as a one-dimensional signal, obtaining multiple one-dimensional signals, and obtaining multiple original frequency spectrums, that is obtaining the frequency spectrums of each row or column of the original image. Since the amount of information in each frequency spectrum is small, the central frequency point corresponding to the fringe noise may be quickly determined, thereby improving the efficiency of denoising.

For example, it is assumed the original image may be expressed as $$A_1 \; A_2 \; A_3$$
$$B_1 \; B_2 \; B_3$$
$$C_1 \; C_2 \; C_3$$

in the spatial domain. Three one-dimensional signals are obtained using the above method. If sampling the original image row by row, $A_1 \, A_2 \, A_3$, $B_1 \, B_2 \, B_3$, and $C_1 \, C_2 \, C_3$ are obtained; and if sampling the original image column by column, $A_1 \, B_1 \, C_1$, $A_2 \, B_2 \, C_2$, and $A_3 \, B_3 \, C_3$ are obtained.

Subsequent to acquire the one-dimensional signal, the one-dimensional signal may be transformed into the frequency domain by using FFT to obtain the original frequency spectrum of the original image. Of course, the one-dimensional signal may also be transformed into the frequency domain in other ways, which is not specifically limited here.

In step S102, the noise frequency band in the original frequency spectrum is determined.

The noise frequency band is a frequency band including the central frequency of the fringe noise. Exemplarily, assuming that the central frequency of the fringe noise is 400, the noise frequency band may be 300-500.

Subsequent to obtain the original frequency spectrum, the central frequency point of the fringe noise is determined from the original frequency spectrum, and a certain frequency band is extended to both sides based on the central frequency point of the fringe noise to obtain the noise frequency band. The respective methods of determining the central frequency point of the fringe noise from the frequency spectrum may be adopted for the central frequency point of the fringe noise determined from the original frequency spectrum. For example, the peak of the frequency spectrum is searched from the frequency band to the right of the original frequency spectrum, and the frequency point corresponding to the largest peak is used as the central frequency point of the fringe noise. The frequency band extended to both sides based on the central frequency point of fringe noise may be a predetermined value, which may be adjusted according to the actual denoising effect, and the frequency bands extended to the both sides may be the same or different, which is not specifically limited here.

In practical applications, it may start from the central frequency point corresponding to the fringe noise and extend the same frequency band to both sides, that is, the central frequency point of the fringe noise is in a middle of the noise frequency band. In this way, subsequent to the fringe noise is denoised, the transition of high-frequency components such as the edge texture of the image may be made more uniform and natural.

In step S103, the noise frequency band is denoised to obtain a denoised frequency spectrum.

Where, a denoising intensity used in the denoising is gradually increased from a start frequency position of the noise frequency band, and the denoising intensity is gradually reduced from the central frequency until a stop frequency position of the noise frequency band.

The end points on both sides of the noise frequency band are the start frequency and the stop frequency respectively. The energy suppression is gradually increased from the start frequency position. The amount of energy suppression starts to decrease in the central frequency point position until the stop frequency position. In addition, the energy corresponding to frequencies outside the noise frequency band in the original frequency spectrum is not suppressed.

In this way, the fringe noise may be removed in the frequency domain, and the useful information near the noise point may be retained.

In step S104, a denoised image is generated according to the denoised frequency spectrum.

Subsequent to obtain denoised frequency spectrum, for example, the denoised frequency spectrum may be transformed to the spatial domain through IFFT transformation to obtain a denoised image. The denoised image at this time is an image obtained by removing the fringe noise from the original image. For the specific transformation method of transforming the denoised frequency spectrum from the frequency domain to the spatial domain, in addition to the IFFT, other transformation methods that may transform the spectrum from the frequency domain to the spatial domain may also be used, which is not specifically limited here.

According to the method for removing a fringe noise in an image provided by an embodiment of the present disclosure, the original frequency spectrum of the one-dimensional signal of the original image is acquired; the noise frequency band is determined from the original frequency spectrum, and the noise frequency band is a frequency band containing a central frequency point of the fringe noise. Then, the noise frequency band is denoised to obtain a denoised frequency spectrum, and a denoising intensity used in the denoising is gradually increased from a start frequency position of the noise frequency band, and the denoising intensity is gradually reduced from the central frequency point until a stop frequency position of the noise frequency band. Then, a denoised image is generated according to the denoised frequency spectrum. In the process of removing the fringe noise in the original image, by determining the noise frequency band in the frequency spectrum of the original image, the denoising intensity is gradually increased from the start frequency position of the noise frequency band, and the denoising intensity is gradually reduced from the central frequency position. Not only may effectively suppress the fringe noise, but also retain useful information near noise frequency points, thereby making the transition of the image edge more natural, avoiding ringing effects, and improving image quality.

Figure 2:
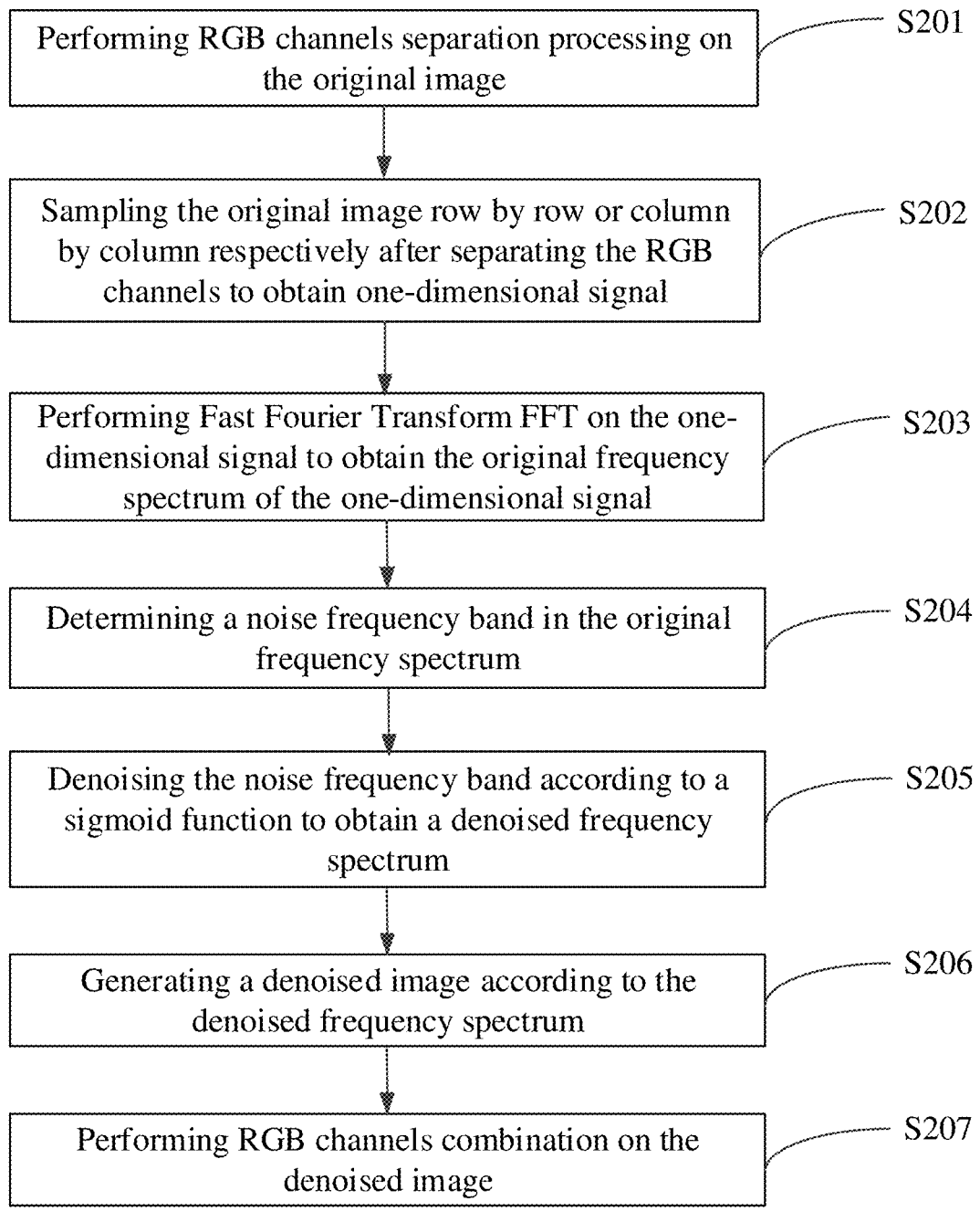
FIG. 2 is a flowchart of another method for removing fringe noise in an image according to an embodiment of the present disclosure.

Furthermore, an embodiment of the present disclosure also provides another method for removing a fringe noise in an image. FIG. 2 is a flowchart of another method for removing a fringe noise in an image according to an embodiment of the present disclosure. As shown in FIG. 2, the method may include the following steps.

In step S201, RGB channels separation is performed on an original image.

The original image may include three channels of red, green, and blue. RGB represents Red, Green, and Blue. Separating the RGB channels of the original image includes separating the original image into a red channel original image, a green channel original image, and a blue channel original image, and the original image of each channel may be denoised respectively. To perform RGB channels separation on the original image, various methods of RGB three channels separation on the image may be used, which will not be repeated here.

In step S202, the original image is sampled row by row or column by column respectively after separating the RGB channels to obtain a one-dimensional signal.

Subsequent to obtain the red channel original image, the green channel original image, and the blue channel original image, sampling the red channel original image row by row or column by column, sampling the green channel original image row by row or column by column, and sampling the blue channel original image row by row or column by column respectively.

For example, in response to the fringe noise contained in the original image being a horizontal fringe noise, sampling the red channel original image column by column, sampling the green channel original image column by column, and sampling the blue channel original image column by column respectively. Alternatively, in response to the fringe noise contained in the original image being a vertical fringe noise, sampling the red channel original image row by row, sampling the green channel original image row by row, and sampling the blue channel original image row by row respectively.

The following steps may be used to determine whether the fringe noise in the original image is a horizontal fringe noise or a vertical fringe noise.

Any row of the original image may be sampled to obtain a one-dimensional row signal, and any column of the original image may be sampled to obtain a one-dimensional column signal.

As the red channel original image, the green channel original image, and the blue channel original image have the same fringe form, any row of the original image of any one of the red channel original image, the green channel original image, and the blue channel original image may be sampled to obtain a one-dimensional row signal, and any column of the original image of any one of the red channel original image, the green channel original image, and the blue channel original image may be sampled to obtain a one-dimensional column signal.

FFT is performed on the one-dimensional row signal and the one-dimensional column signal respectively to obtain the frequency spectrum of the one-dimensional row signal and the frequency spectrum of the one-dimensional column signal.

A first peak is determined in the predetermined frequency band of the frequency spectrum of the one-dimensional row signal, and a second peak is determined in the predetermined frequency band of the frequency spectrum of the one-dimensional column signal, and the first peak is compared with the second peak.

Here, the predetermined frequency band corresponding to the one-dimensional row signal and the predetermined frequency band corresponding to the one-dimensional column signal may be the same. Moreover, the central frequency point corresponding to the fringe noise is in the predetermined frequency band.

In response to the first peak being less than or equal to the second peak value, it is determined that the fringe noise in the original image is a horizontal fringe noise. In response to the first peak being greater than the second peak, it is determined that the fringe noise in the original image is a vertical fringe noise.

As a result, it may be determined whether the fringe noise in the original image is a horizontal fringe noise or a vertical fringe noise, and the original image may be sampled column by column or row by row.

In step S203, FFT is performed on the one-dimensional signal to obtain the original frequency spectrum of the one-dimensional signal.

It may perform FFT on the one-dimensional signal corresponding to the red channel in the original image to obtain the original frequency spectrum of the one-dimensional signal corresponding to the red channel, perform FFT on the one-dimensional signal corresponding to the green channel in the original image to obtain the original frequency spectrum of the one-dimensional signal corresponding to the green channel, and perform FFT on the one-dimensional signal corresponding to the blue channel in the original image to obtain the original frequency spectrum of the one-dimensional signal corresponding to the blue channel.

Where, the implementation of this step is the same as the implementation of step 101, and will not be repeated here.

In step S204, the noise frequency band is determined from the original frequency spectrum.

A noise frequency band may be determined from the original frequency spectrum corresponding to the red channel, a noise frequency band may be determined from the original frequency spectrum corresponding to the green channel, and a noise frequency band may be determined from the original frequency spectrum corresponding to the blue channel.

Where, the implementation of this step is the same as the implementation of step 102, and will not be repeated here.

In step S205, the noise frequency band is denoised according to the sigmoid function $$H(x) = 1 - \frac{1}{1 + e^{\left(\frac{-(x-x_{bs})}{\theta}\right)}} + \frac{1}{1 + e^{\left(\frac{-(x-x_{be})}{\theta}\right)}}$$

to obtain a denoised frequency spectrum.

Where, $x_{bs}$ is a start frequency of the noise frequency band, $x_{be}$ is a stop frequency of the noise frequency band, and $\theta$ is a steep coefficient of a transition band of a band-stop filter.

The sigmoid function has the properties of monotone increasing and inverse function monotone increasing, which may map variables between 0 and 1. Therefore, by bringing the start frequency and the stop frequency in the noise frequency band into the sigmoid function for calculation, the degree of suppression of the energy corresponding to each frequency in the noise frequency band may be determined, and then the result calculated by the sigmoid function is multiplied with the original frequency spectrum to obtain a denoised frequency spectrum. And a calculation result of 0 means complete suppression, and a calculation result of 1 means no suppression. The larger the $\theta$, the more obvious the suppression of changes. Conversely, the smaller the $\theta$, the less obvious the suppression of changes. In practical applications, $\theta$ may be adjusted according to the actual denoising effect.

From the point of view of the band-stop filter, in the result calculated by the sigmoid function, the ordinate 0 corresponds to the stop-band, the gain is 0, and the energy of the corresponding frequency in the original frequency spectrum may be completely suppressed. The ordinate 1 corresponds to the pass-band, the gain is 1, and the energy of the corresponding frequency in the original frequency spectrum may not be suppressed. The ordinate 0-1 corresponds to the transition-band, the gain is 0-1, and the degree of suppression of the energy of the corresponding frequency in the original frequency spectrum varies with the frequency, and the closer to the stop-band, the greater the degree of suppression of the energy of the corresponding frequency in the original frequency spectrum.

For example, the sigmoid function is used to denoise the filter-band of the original frequency spectrum corresponding to the red channel to obtain a denoised frequency spectrum corresponding to the red channel, denoise the filter-band of the original frequency spectrum corresponding to the green channel to obtain a denoised frequency spectrum corresponding to the green channel, and denoise the filter-band of the original frequency spectrum corresponding to the blue channel to obtain a denoised frequency spectrum corresponding to the blue channel.

In step S206, a denoised image is generated according to the denoised frequency spectrum.

For example, subsequent to obtain the denoised frequency spectrum corresponding to the red channel, the denoised frequency spectrum corresponding to the green channel, and the denoised frequency spectrum corresponding to the blue channel, performing IFFT on the denoised frequency spectrum corresponding to the red channel, the denoised frequency spectrum corresponding to the green channel, and the denoised frequency spectrum corresponding to the blue channel to obtain the denoised image corresponding to the red channel, the denoised image corresponding to the green channel, and the denoised image corresponding to the blue channel.

The implementation of this step is the same as the implementation of step 104, and will not be repeated here.

In step S207, RGB channels combination is performed on the denoised image.

For example, subsequent to obtain the denoised image corresponding to the red channel, the denoised image corresponding to the green channel, and the denoised image corresponding to the blue channel, combining the RGB channels of the denoised image corresponding to the red channel, the denoised image corresponding to the green channel, and the denoised image corresponding to the blue channel to obtain a complete denoised image.

In the following, a specific example is used to illustrate the process of removing the fringe noise in the original image through the method for removing fringe noise in the original image of the embodiment of the present disclosure.

Figure 3:
FIG. 3 shows an example original image of an embodiment of the present disclosure.

FIG. 3 is an example original image in an embodiment of the disclosure. As shown in FIG. 3, there is a horizontal fringe noise in the original image. First, the original image is sampled column by column to obtain multiple one-dimensional signals. Second, FFT is performed on each one-dimensional signal respectively to obtain multiple original frequency spectrums.

Figure 4:
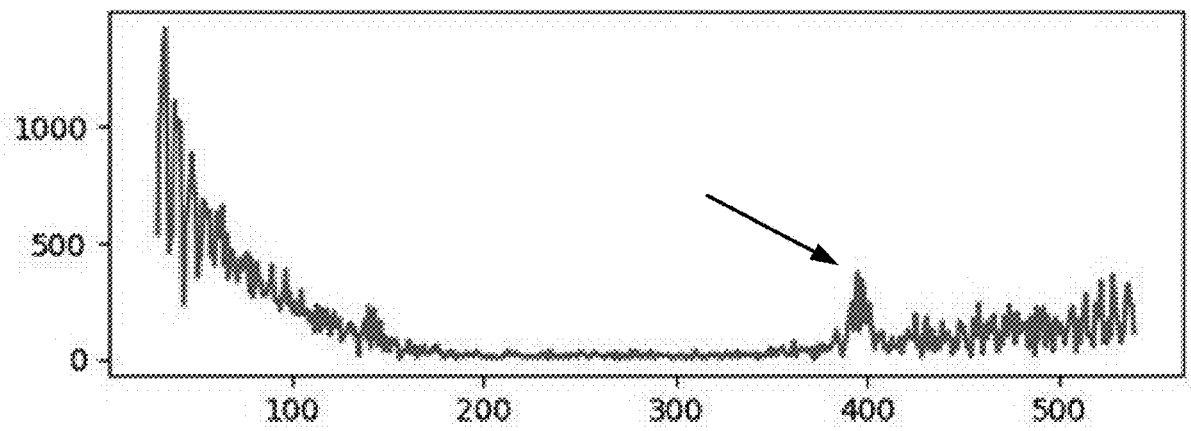
FIG. 4 shows an example of an original frequency spectrum of a certain column of an original image according to an embodiment of the present disclosure.

FIG. 4 is original frequency spectrum corresponding to a certain column of the original image in the embodiment of the disclosure. Referring to FIG. 4, it may be seen that the frequency corresponding to the peak indicated by the arrow in the figure is a central frequency point corresponding to the fringe noise, that is, 400. Then, a noise frequency band is determined from the original frequency spectrum, that is, 300-500, and the noise frequency band is denoised according to the sigmoid function $$H(x) = 1 - \frac{1}{1 + e^{\left(\frac{-(x-x_{bs})}{\theta}\right)}} + \frac{1}{1 + e^{\left(\frac{-(x-x_{be})}{\theta}\right)}}$$

to obtain the denoised frequency spectrum, where $x_{bs}=300$, $x_{be}=500$, $\theta=20$.

Figure 5:
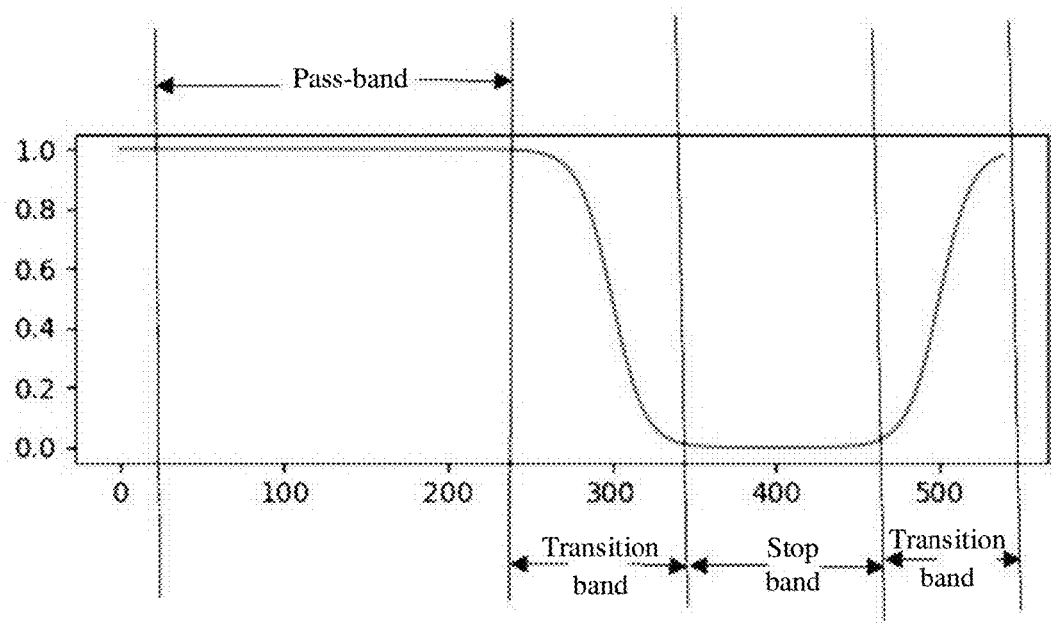
FIG. 5 shows a schematic diagram of a band-stop filter based on a sigmoid function according to an embodiment of the present disclosure.

FIG. 5 is a schematic diagram of a band-stop filter according to a sigmoid function in an embodiment of the disclosure. As shown in FIG. 5, the gain of the stop-band is 0, that is, the corresponding frequency spectrum energy is completely attenuated; the gain of the transition band is 0-1, that is, the corresponding frequency spectrum energy is partially attenuated from more to less; and the gain of the pass-band is 1, that is, the corresponding frequency spectrum energy is not attenuated. In this way, the useful information near the noise frequency point may be retained, and then IFFT is performed on the denoised frequency spectrum to obtain a denoised image.

Figure 6:
FIG. 6 shows a comparison diagram of a denoised image and an original image according to an embodiment of the present disclosure.

FIG. 6 is a comparison diagram of the denoised image and the original image in the embodiment of the disclosure. As shown in FIG. 6, the denoised image 6B has a better fringe noise removal effect, and details such as the hair strands, skin edges, text edges are well preserved compared with the original image 6A.

It may be seen from the above content that, in the method for removing fringe noise in an image provided by the embodiments of the present disclosure, firstly, RGB channels separation is performed on the original image. Then, the original image is sampled row by row or column by column respectively after separating the RGB channels to obtain a one-dimensional signal. Then, FFT is performed on the one-dimensional signal to obtain an original frequency spectrum of the one-dimensional signal. Then, the noise frequency band is determined from the original frequency spectrum. Furthermore, the noise frequency band is denoised according to the sigmoid function $$H(x) = 1 - \frac{1}{1 + e^{\left(\frac{-(x-x_{bs})}{\theta}\right)}} + \frac{1}{1 + e^{\left(\frac{-(x-x_{be})}{\theta}\right)}}$$

to obtain the denoised frequency spectrum. Furthermore, a denoised image is generated based on the denoised frequency spectrum and the RGB channels of the denoised image are combined. In this way, a complete denoised image is obtained. In the process of removing the fringe noise of the original image, by determining the noise frequency band in the frequency spectrum of the original image, the noise frequency band is denoised according to the sigmoid function to obtain the denoised frequency spectrum, and the denoised frequency spectrum is transformed back to the spatial domain to obtain the denoised image. In this way, not only may the fringe noise be effectively suppressed, but also useful information near the noise frequency points may be retained, thereby making the transition of the image edge more natural, avoiding the ringing effect, and improving the image quality.

Figure 7:
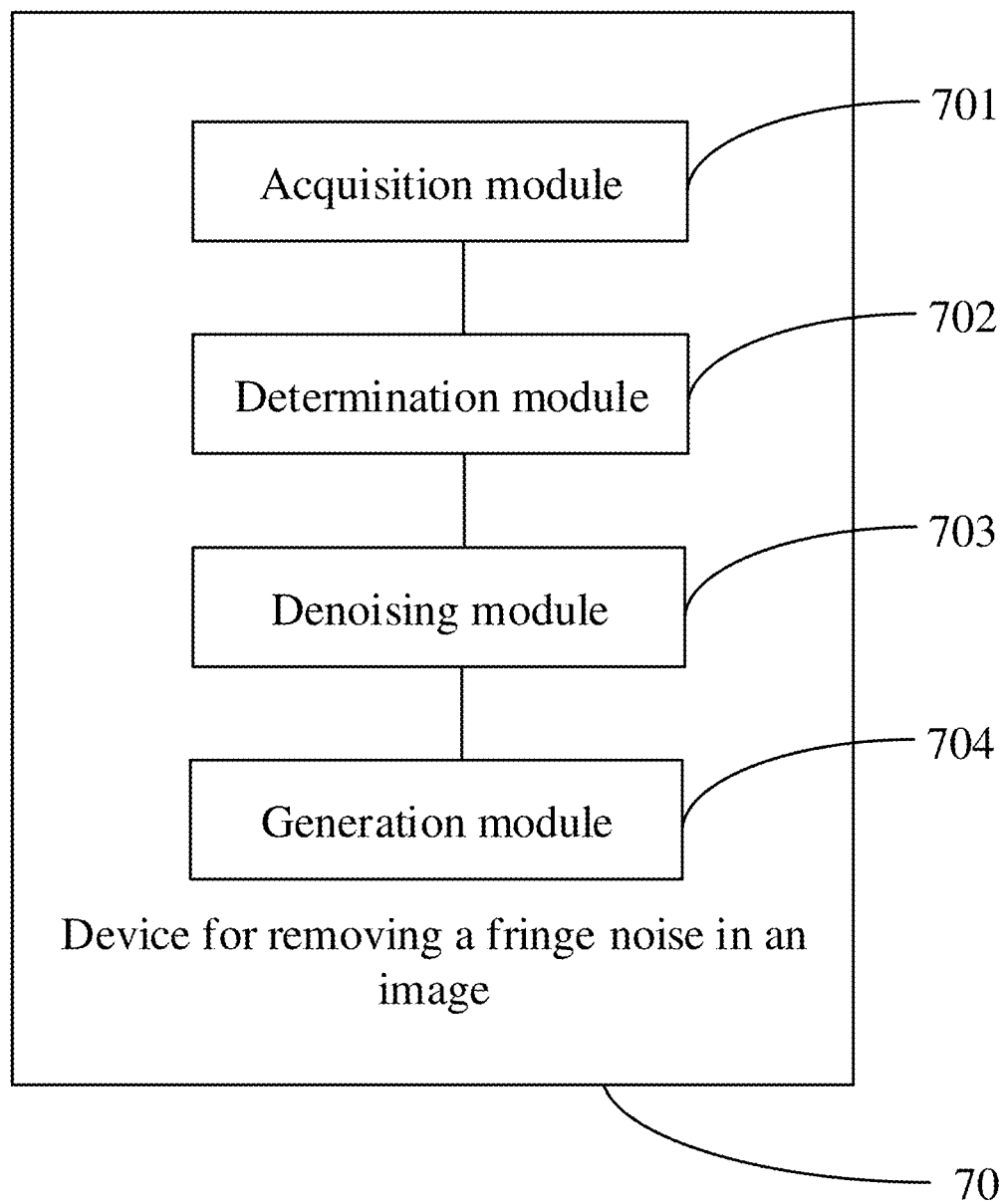
FIG. 7 shows a schematic structural diagram of a device for removing fringe noise in an image according to an embodiment of the present disclosure.

An embodiment of the present disclosure also provides a device for removing a fringe noise in an image. FIG. 7 is a schematic structural diagram of a device for removing a fringe noise in an image in an embodiment of the disclosure. As shown in FIG. 7, the device 70 may include: an acquisition module 701 configured to acquire an original image and acquire an original frequency spectrum of one-dimensional signal of the original image; a determination module 702 configured to determine a noise frequency band in the original frequency spectrum, and the noise frequency band is a frequency band comprising a central frequency point corresponding to the fringe noise; a denoising module 703 configured to denoise the noise frequency band to obtain a denoised frequency spectrum, and a denoising intensity is gradually increased from a start frequency position of the noise frequency band, and the denoising intensity is gradually reduced from the central frequency until a stop frequency position of the noise frequency band; a generation module 704 configured to generate a denoised image according to the denoised frequency spectrum.

Based on the foregoing embodiment, the central frequency point corresponding to the fringe noise is in the middle of the noise frequency band.

Based on the foregoing embodiment, the denoising module is configured to denoise the noise frequency band according to a sigmoid function $$H(x) = 1 - \frac{1}{1 + e^{\left(\frac{-(x-x_{bs})}{\theta}\right)}} + \frac{1}{1 + e^{\left(\frac{-(x-x_{be})}{\theta}\right)}};$$

where, $x_{bs}$ is a start frequency of the noise frequency band, $x_{be}$ is a stop frequency of the noise frequency band, and $\theta$ is a steep coefficient of a transition band of a band-stop filter.

Figure 8:
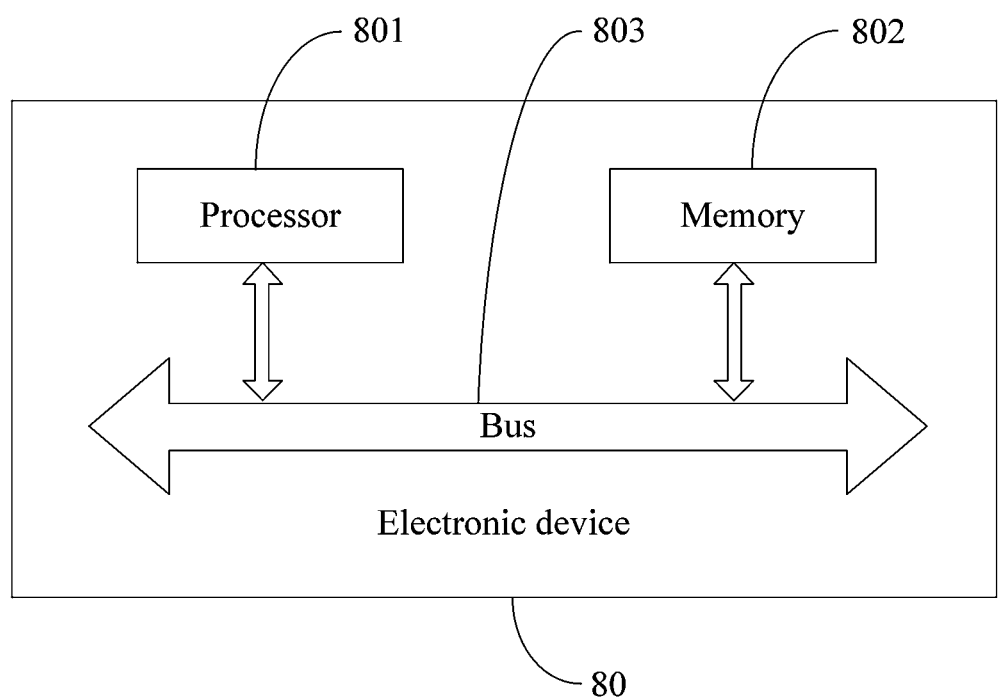
FIG. 8 shows a schematic structural diagram of an electronic device according to an embodiment of the present disclosure.

An embodiment of the present disclosure also provides an electronic device. FIG. 8 is a schematic structural diagram of an electronic device in an embodiment of the disclosure. As shown in FIG. 8, the electronic device 80 may include: at least one processor 801; and at least one memory 802 and a bus 803 connected to the processor 801. The processor 801 and the memory 802 communicate with each other via the bus 803. The processor 801 is configured to call the program instructions in the memory 802 to execute the method for removing a fringe noise in an image in one or more embodiments.

Based on the same disclosed concept, an embodiment of the present disclosure also provides a non-transitory computer-readable storage medium. The above-mentioned non-transitory computer-readable storage medium includes a stored program. When the program running, the device where the storage medium is located is controlled to execute the method for removing fringe noise in the image in one or more of the above embodiments.

Those skilled in the art should understand that the embodiments of the present disclosure may be provided as methods, systems, or computer program products. Therefore, this disclosure may adopt the form of a complete hardware embodiment, a complete software embodiment, or an embodiment combining software and hardware. Moreover, this disclosure may adopt the form of a computer program product implemented on one or more computer-usable storage media (including but not limited to disk storage, CD-ROM, optical storage, etc.) containing computer-usable program codes.

This disclosure is described with reference to flowcharts and/or block diagrams of methods, devices (systems), and computer program products according to embodiments of this disclosure. It should be understood that each process and/or block in the flowchart and/or block diagram, and the combination of processes and/or blocks in the flowchart and/or block diagram may be realized by computer program instructions. These computer program instructions may be provided to the processor of a general-purpose computer, a special-purpose computer, an embedded processor, or other programmable data processing equipment to generate a machine, and the instructions executed by the processor of the computer or other programmable data processing equipment are generated to realize the functions specified in one process or multiple processes in the flowchart and/or one block or multiple blocks in the block diagram.

These computer program instructions may also be stored in a computer-readable memory that may direct a computer or other programmable data processing equipment to work in a specific manner, and the instructions stored in the computer-readable memory produce an article of manufacture including the instruction device. The instruction device implements the functions specified in one process or multiple processes in the flowchart and/or one block or multiple blocks in the block diagram.

These computer program instructions may also be loaded on a computer or other programmable data processing equipment, and a series of operation steps are executed on the computer or other programmable equipment to produce computer-implemented processing, so that the instructions execute on the computer or other programmable equipment provide steps for implementing functions specified in one process or multiple processes in the flowchart and/or one block or multiple blocks in the block diagram.

In a typical configuration, the computing device includes one or more processors (CPU), input/output interfaces, network interfaces, and memory.

The memory may include non-permanent memory in a computer readable medium, random access memory (RAM) and/or non-volatile memory, such as read-only memory (ROM) or flash memory (flash RAM). The memory is an example of a computer-readable medium.

Computer-readable media includes permanent and non-permanent, removable and non-removable media, and information storage may be realized by any method or technology. The information may be computer-readable instructions, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic cassettes, magnetic tape magnetic disk storage or other magnetic storage devices or any other non-transmission media may be used to store information that may be accessed by computing devices. According to the definition in this disclosure, computer-readable media does not include transitory media, such as modulated data signals and carrier waves.

It should also be noted that the terms "including", "containing" or any other variants thereof are intended to cover non-exclusive inclusion, so that a process, method, commodity or equipment including a series of elements includes not only those elements, but also other elements that are not explicitly listed, or also include elements inherent to such processes, methods, commodities, or equipment. If there are no more restrictions, the element defined by the sentence "including a . . . " does not exclude the existence of other identical elements in the process, method, commodity or equipment that includes the element.

Those skilled in the art should understand that the embodiments of the present disclosure may be provided as methods, systems, or computer program products. Therefore, this disclosure may adopt the form of a complete hardware embodiment, a complete software embodiment, or an embodiment combining software and hardware. Moreover, this disclosure may adopt the form of a computer program product implemented on one or more computer-usable storage media (including but not limited to disk storage, CD-ROM, optical storage, etc.) containing computer-usable program codes.

The above are only examples of the disclosure, and are not used to limit the disclosure. For those skilled in the art, this disclosure may have various modifications and changes. Any modification, equivalent replacement, improvement, etc. made within the spirit and principle of this disclosure shall be included in the scope of the claims of this disclosure.

What is claimed is:

1. A method for removing fringe noise in an image, comprising:
  acquiring an original image;
  acquiring an original frequency spectrum of one-dimensional signal of the original image;
  determining a noise frequency band in the original frequency spectrum, wherein the noise frequency band is a frequency band comprising a central frequency of the fringe noise;
  denoising the noise frequency band to obtain a denoised frequency spectrum, wherein a denoising intensity used in the denoising is gradually increased from a start frequency position of the noise frequency band, and the denoising intensity is gradually reduced from the central frequency until a stop frequency position of the noise frequency band; and
  generating a denoised image according to the denoised frequency spectrum,
  wherein the acquiring an original frequency spectrum of one-dimensional signal of the original image comprises:
    sampling the original image row by row or column by column to obtain the one-dimensional signal; and
    performing Fast Fourier Transform (FFT) on the one-dimensional signal to obtain the original frequency spectrum of the one-dimensional signal,
  wherein the sampling the original image row by row or column by column comprises:
    in response to the fringe noise contained in the original image being a horizontal fringe noise, sampling the original image column by column, and
  wherein the sampling the original image column by column comprises:
    sampling any row of the original image to obtain a one-dimensional row signal, and sampling any column of the original image to obtain a one-dimensional column signal;
    performing FFT on the one-dimensional row signal and the one-dimensional column signal respectively to obtain a frequency spectrum of the one-dimensional row signal and a frequency spectrum of the one-dimensional column signal;
    determining a first peak of a predetermined frequency band of the frequency spectrum of the one-dimensional row signal, and determining a second peak of a predetermined frequency band of the frequency spectrum of the one-dimensional column signal;
    comparing the first peak with the second peak;
    in response to the first peak being less than or equal to the second peak, determining that the fringe noise in the original image is the horizontal fringe noise; and
    in response to the first peak being greater than the second peak value, determining that the fringe noise in the original image is the vertical fringe noise.

2. The method according to claim 1, wherein the central frequency of the fringe noise is in a middle of the noise frequency band.

3. The method according to claim 1, wherein the denoising the noise frequency band comprises:
  denoising the noise frequency band according to a sigmoid function $$H(x) = 1 - \frac{1}{1+e^{\left(\frac{-(x-x_{bs})}{\theta}\right)}} + \frac{1}{1+e^{\left(\frac{-(x-x_{be})}{\theta}\right)}};$$

wherein $x_{bs}$ is a start frequency of the noise frequency band, $x_{be}$ is a stop frequency of the noise frequency band, and $\theta$ is a steep coefficient of a transition band of a band-stop filter.

4. The method according to claim 2, wherein the denoising the noise frequency band comprises:
  denoising the noise frequency band according to a sigmoid function $H(x)=1-$ $$H(x) = 1 - \frac{1}{1+e^{\left(\frac{-(x-x_{bs})}{\theta}\right)}} + \frac{1}{1+e^{\left(\frac{-(x-x_{be})}{\theta}\right)}};$$

wherein $x_{bs}$ is a start frequency of the noise frequency band, $x_{be}$ is a stop frequency of the noise frequency band, and $\theta$ is a steep coefficient of a transition band of a band-stop filter.

5. The method according to claim 2, wherein the acquiring an original frequency spectrum of one-dimensional signal of the original image comprises:
  sampling the original image row by row or column by column to obtain the one-dimensional signal; and
  performing Fast Fourier Transform (FFT) on the one-dimensional signal to obtain the original frequency spectrum of the one-dimensional signal.

6. The method according to claim 1, wherein the sampling the original image row by row or column by column comprises:
  performing RGB channels separation processing on the original image; and
  sampling the original image row by row or column by column respectively.

7. The method according to claim 6, further comprising performing RGB channels combination on the denoised image.

8. The method according to claim 5, wherein the sampling the original image row by row or column by column comprises:
  performing RGB channels separation processing on the original image; and
  sampling the original image row by row or column by column respectively.

9. The method according to claim 8, further comprising performing RGB channels combination on the denoised image.

10. The method according to claim 5, wherein the sampling the original image row by row or column by column comprises:
  in response to the fringe noise contained in the original image being a horizontal fringe noise, sampling the original image column by column.

11. The method according to claim 5, wherein the sampling the original image row by row or column by column comprises:
  in response to the fringe noise contained in the original image being a vertical fringe noise, sampling the original image row by row.

12. The method according to claim 1, wherein the sampling the original image row by row or column by column comprises:

in response to the fringe noise contained in the original image being a vertical fringe noise, sampling the original image row by row.

13. The method according to claim 10, wherein the sampling the original image column by column comprises:
   sampling any row of the original image to obtain a one-dimensional row signal, and sampling any column of the original image to obtain a one-dimensional column signal;
   performing FFT on the one-dimensional row signal and the one-dimensional column signal respectively to obtain a frequency spectrum of the one-dimensional row signal and a frequency spectrum of the one-dimensional column signal;
   determining a first peak of a predetermined frequency band of the frequency spectrum of the one-dimensional row signal, and determining a second peak of a predetermined frequency band of the frequency spectrum of the one-dimensional column signal;
   comparing the first peak with the second peak;
   in response to the first peak being less than or equal to the second peak, determining that the fringe noise in the original image is the horizontal fringe noise; and
   in response to the first peak being greater than the second peak value, determining that the fringe noise in the original image is the vertical fringe noise.

14. The method according to claim 11, wherein sampling the original image row by row comprises:
   sampling any row of the original image to obtain a one-dimensional row signal, and sampling any column of the original image to obtain a one-dimensional column signal;
   performing FFT on the one-dimensional row signal and the one-dimensional column signal respectively to obtain a frequency spectrum of the one-dimensional row signal and a frequency spectrum of the one-dimensional column signal;
   determining a first peak of a predetermined frequency band of the frequency spectrum of the one-dimensional row signal, and determining a second peak of a predetermined frequency band of the frequency spectrum of the one-dimensional column signal;
   comparing the first peak with the second peak;
   in response to the first peak being less than or equal to the second peak, determining that the fringe noise in the original image is a horizontal fringe noise; and
   in response to the first peak being greater than the second peak, determining that the fringe noise in the original image is a vertical fringe noise.

15. An electronic device, comprising:
   at least one processor; and
   at least one memory connected to the processor, on which computer-readable instructions are stored;
   wherein the processor is configured to execute the computer-readable instructions to implement the method according to claim 1.

16. A non-transitory computer-readable storage medium comprising computer-readable instructions stored thereon, wherein when the computer-readable instructions are executed, the method according to claim 1 is executed.

* * * * *